US011853985B2

(12) United States Patent
D'Agostino et al.

(10) Patent No.: US 11,853,985 B2
(45) Date of Patent: Dec. 26, 2023

(54) SYSTEMS AND METHODS FOR CONFIGURING RESOURCE TRANSFERS

(71) Applicant: The Toronto-Dominion Bank, Toronto (CA)

(72) Inventors: Dino Paul D'Agostino, Richmond Hill (CA); Alexander Copeland Wright, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/331,898

(22) Filed: May 27, 2021

(65) Prior Publication Data

US 2022/0383278 A1 Dec. 1, 2022

(51) Int. Cl.
*G06Q 20/10* (2012.01)
*H04L 41/22* (2022.01)
*G06Q 20/34* (2012.01)

(52) U.S. Cl.
CPC ......... *G06Q 20/105* (2013.01); *G06Q 20/341* (2013.01); *G06Q 20/3552* (2013.01); *H04L 41/22* (2013.01)

(58) Field of Classification Search
CPC ............... G06Q 20/105; G06Q 20/341; G06Q 20/3552; H04L 41/22
See application file for complete search history.

(56) References Cited

U.S. PATENT DOCUMENTS

| 8,726,186 | B2* | 5/2014 | Grosz | G06F 40/103 |
| | | | | 358/1.18 |
| 9,092,763 | B2* | 7/2015 | Meszaros | G06Q 20/28 |
| 9,582,827 | B2 | 2/2017 | Glass et al. | |
| 9,659,323 | B2 | 5/2017 | Friedman | |
| 10,262,346 | B2* | 4/2019 | Glass | G06Q 30/06 |
| 10,535,095 | B2 | 1/2020 | Glass et al. | |

(Continued)

FOREIGN PATENT DOCUMENTS

| EP | 2766830 | 4/2013 | |
| WO | WO-0152099 A1 * | 7/2001 | G06Q 30/02 |

(Continued)

OTHER PUBLICATIONS

Roth, Emma: 6 Creative Ways to Give Money as a Gift Online, Jun. 15, 2020, pp. 1-19 (Year: 2020).*
Singleton, Tommie W.: Testing Control Associated With Data Transfers, Mar. 1, 2012, ISACA Journal, pp. 1-8 (Year: 2012).*
SAP: Configuration Guide to SAP Multisource Scheduling, Option for SAP/4HANA, Jul. 30, 2018, pp. 1-186 (Year: 2018).*

(Continued)

*Primary Examiner* — Bijendra K Shrestha
(74) *Attorney, Agent, or Firm* — Rowand LLP

(57) ABSTRACT

A computer-implemented method is disclosed. The method includes: receiving, via a client device, a request to configure a resource transfer of a first type; determining a first set of themes associated with resource transfers of the first type; and providing, for display on the client device, a user interface for configuring the resource transfer with theme data for a theme, wherein providing the user interface includes: displaying at least a subset of the first set of themes; receiving, via the client device, a selection of one of the themes of the displayed subset; obtaining an indication of available multimedia content items associated with the selected theme; and graphically presenting user interface elements corresponding to the multimedia content items via the user interface.

16 Claims, 10 Drawing Sheets

(56) References Cited

U.S. PATENT DOCUMENTS

| | | | |
|---|---|---|---|
| 10,664,823 B2* | 5/2020 | White | G06Q 20/367 |
| 10,929,922 B1 | 2/2021 | Velline et al. | |
| 11,436,067 B1* | 9/2022 | Greenbacker | G06F 9/542 |
| 2003/0191816 A1* | 10/2003 | Landress | G06Q 30/02 709/219 |
| 2007/0180020 A1* | 8/2007 | Woods | H04L 67/02 709/203 |
| 2007/0204209 A1* | 8/2007 | Truelove | G06F 16/4393 715/203 |
| 2011/0251962 A1 | 10/2011 | Hruska | |
| 2011/0283195 A1* | 11/2011 | Brown | G06F 16/9577 715/744 |
| 2012/0209748 A1 | 8/2012 | Small | |
| 2014/0056576 A1* | 2/2014 | Miura | H04L 65/762 386/284 |
| 2015/0006382 A1* | 1/2015 | Scipioni | G06Q 20/042 705/44 |

FOREIGN PATENT DOCUMENTS

| | | | |
|---|---|---|---|
| WO | WO-2008024870 A2 * | 2/2008 | G06Q 20/10 |
| WO | 2011054055 | 5/2011 | |
| WO | 2014176352 | 10/2014 | |
| WO | 2015056058 | 4/2015 | |

OTHER PUBLICATIONS

Yeung, Ken; PayPal now lets you send designer cards when gifting money this holiday season; Published in VentureBeat; 'https://venturebeat.com/2016/12/06/paypal-now-lets-you-send-designed-cards-when-gifting-money-this-holiday-season/; Dec. 6, 2016.

chase.com; Chase Brings Gifting Right to Your Mobile Phone; https://media.chase.com/news/chase-brings-gifting-right-to-your-mobile-phone; Apr. 15, 2019.

* cited by examiner

SYSTEMS AND METHODS FOR CONFIGURING RESOURCE TRANSFERS

TECHNICAL FIELD

The present disclosure relates to data processing and, in particular, to systems and methods for configuring and processing transfers of resources between computing systems.

BACKGROUND

Resource servers, or servers that are associated with resource management entities, may receive and process resource transfer requests from various computing systems. Such servers may automatically process resource transfer requests, causing a transfer of resources associated with a transferor entity to a recipient entity. The transfer requests are typically associated with resource accounts. In particular, a transferor entity may request to transfer resources (e.g., data) that are associated with a resource account of the transferor entity to one or more data records of a resource account associated with a recipient entity.

A resource transfer may represent a permanent or temporary movement of a defined quantum of resources to an intended recipient. Information about a resource transfer may be collectively referred to as transfer data. The transfer data for a resource transfer may include, for example, transfer processing data for effecting the requested transfer and message data (e.g., instructions, context data, etc.) of one or more messages from the sender to the recipient in connection with the resource transfer.

It is desirable to provide a robust mechanism for configuring the transfer data of resource transfers between computing systems.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
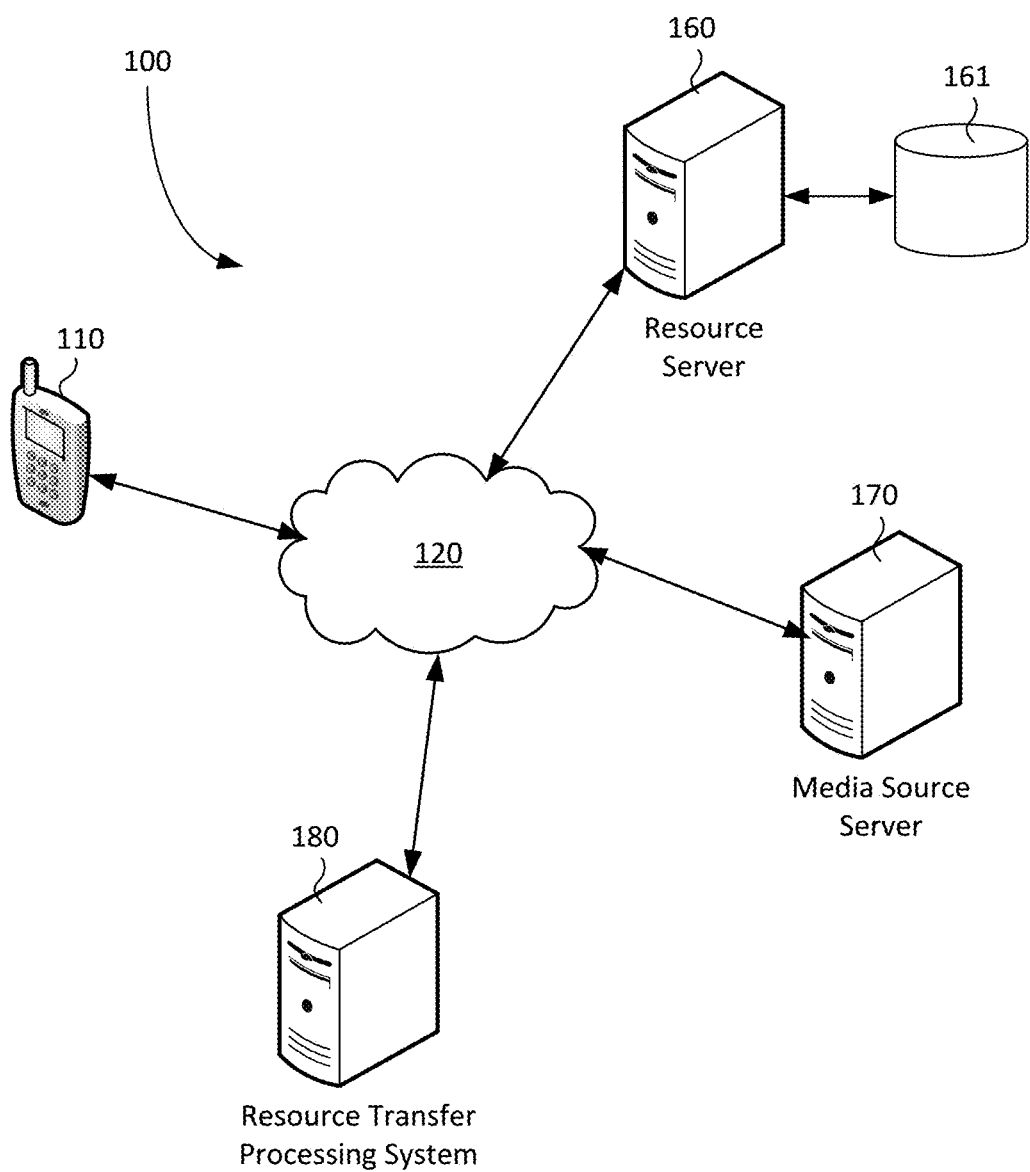
FIG. 1 is a schematic diagram illustrating an operating environment of an example embodiment of the present disclosure.

In one aspect, the present disclosure describes a computing system. The computing system includes a processor, a communications module coupled to the processor, and a memory coupled to the processor. The memory stores instructions that, when executed, configure the processor to: receive, via a client device, a request to configure a resource transfer of a first type; determine a first set of themes associated with resource transfers of the first type; and provide, for display on the client device, a user interface for configuring the resource transfer with theme data for a theme, wherein providing the user interface includes: displaying at least a subset of the first set of themes; receiving, via the client device, a selection of one of the themes of the displayed subset; obtaining an indication of available multimedia content items associated with the selected theme; and graphically presenting user interface elements corresponding to the multimedia content items via the user interface.

In some implementations, the user interface elements corresponding to the multimedia content items may include selectable icons representing image backgrounds for an electronic card associated with the resource transfer.

In some implementations, each theme of the first set may include transfer configuration settings associated with at least one predefined event.

In some implementations, providing the user interface for configuring the resource transfer may further include displaying a preview of an electronic card associated with the resource transfer, the electronic card being formatted in accordance with the selected theme and user-inputted transfer configuration settings.

In some implementations, the multimedia content items may include at least one of image or audio data.

In some implementations, providing the user interface may further include: determining one or more transfer configuration settings associated with the resource transfer; and graphically presenting user interface elements corresponding to the one or more transfer configuration settings via the user interface.

In some implementations, the one or more transfer configuration settings may include a schedule of delivery associated with the resource transfer.

In some implementations, the resource transfer may be an email money transfer.

In some implementations, the instructions, when executed, may further configure the processor to graphically presenting a message composition view via the user interface.

In some implementations, obtaining the indication of available multimedia content items may include sending, to a remote server, a query for retrieving a list of multimedia content items for inclusion in a message that is generated in the message composition view.

In another aspect, a computer-implemented method is disclosed. The method includes: receiving, via a client device, a request to configure a resource transfer of a first type; determining a first set of themes associated with resource transfers of the first type; and providing, for display on the client device, a user interface for configuring the resource transfer with theme data for a theme, wherein providing the user interface includes: displaying at least a subset of the first set of themes; receiving, via the client device, a selection of one of the themes of the displayed subset; obtaining an indication of available multimedia content items associated with the selected theme; and graphically presenting user interface elements corresponding to the multimedia content items via the user interface.

In yet another aspect, a non-transitory computer readable storage medium is disclosed. The computer readable storage medium contains instructions thereon which, when executed by a processor, configure the processor to: receive, via a client device, a request to configure a resource transfer of a first type; determine a first set of themes associated with resource transfers of the first type; and provide, for display on the client device, a user interface for configuring the resource transfer with theme data for a theme, wherein providing the user interface includes: displaying at least a subset of the first set of themes; receiving, via the client device, a selection of one of the themes of the displayed subset; obtaining an indication of available multimedia content items associated with the selected theme; and graphically presenting user interface elements corresponding to the multimedia content items via the user interface.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Various types of resources, such as data, system resources (e.g., processing power, memory capacity), and the like, may be transferred between computing systems and/or databases. Conventional systems for processing transfers of resources allow only limited customization of the transfer data of resource transfers. That is, transferor entities may only have limited options for customizing (or configuring) transfers of their resources to intended recipients.

The present application discloses techniques for configuring transfers of resources associated with resource accounts. More specifically, systems and methods for configuring transfer data of resource transfers are described. Upon receiving a request to configure a resource transfer of a particular type, the disclosed system determines a first set of themes associated with resource transfers of that type and provides, for display on a client device, a user interface for configuring the resource transfer. The user interface is provided by presenting a subset of the first set of themes to the transferor, receiving a selection of one of the themes, and obtaining an indication of available multimedia content items associated with the selected theme. The system graphically presents user interface elements corresponding to the multimedia content items via the user interface on the client device, enabling selection of multimedia content items that are to be associated with the resource transfer. In particular, the selected multimedia content items may be included in message data of a message that is provided to the intended recipient, concurrently or prior to the resource transfer.

FIG. 1 is a schematic diagram illustrating an operating environment of an example embodiment. In particular, FIG. 1 illustrates exemplary components of a computing environment 100 for processing resource transfer requests in connection with resource accounts. As a specific example, the computing environment 100 of FIG. 1 may be implemented to facilitate configuring transfer data of resource transfers and processing push-based transfers of resources between computing systems. The computing environment 100 includes, at least, one or more client devices 110, a resource server 160, a media source server 170, and a resource transfer processing system 180.

As illustrated, a resource server 160 (which may also be referred to as a server computer system) and client device 110 communicate via the network 120. The client device 110 is a computing device that may be associated with an entity, such as a client, having resources associated with the resource server 160. The client device 110 may take a variety of forms including, for example, a mobile communication device such as a smartphone, a tablet computer, a wearable computer such as a head-mounted display or smartwatch, a laptop or desktop computer, or a computing device of another type.

The resource server 160 may track, manage, and maintain resources, make lending decisions, and/or lend resources to the entity. The resources may, for example, be computing resources, such as memory or processor cycles. By way of further example, the resources may include stored value, such as fiat currency, which may be represented in a database. For example, the resource server 160 may be coupled to a database 161, which may be provided in secure storage. The secure storage may be provided internally within the resource server 160 or externally. The secure storage may, for example, be provided remotely from the resource server 160. For example, the secure storage may include one or more data centers. The data centers may, for example, store data with bank-grade security.

The database 161 may include data records for a plurality of accounts and at least some of the data records may define a quantity of resources associated with an entity. For example, the entity that is associated with the client device 110 may be associated with an account having one or more data records in the database. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated data record such as, for example, a bank balance.

The resource server 160 may, for example, be a financial institution server that is operated by a financial institution and the entity may be a customer of the financial institution.

The client device 110 may be used, for example, to configure resource transfers. More particularly, the client device 110 may be used to configure resource transfers from a resource account associated with an entity operating the client device 110. A resource transfer may involve a transfer of data between a data record in the database 161 associated with such an account and another data record in the database 161 (or in another database, such as a database associated with another server that is coupled to the resource server 160 via a network). The other data record may be associated with a data transfer recipient such as, for example, a bill payment recipient. The data involved in the transfer may, for example, be units of value and the data records involved in the data transfer may be adjusted in related or corresponding manners. For example, during a data or value transfer, a data record associated with the transfer recipient may be adjusted to reflect an increase in value due to the transfer whereas the data record associated with the entity initiating the transfer may be adjusted to reflect a decrease in value which is at least as large as the increase in value applied to the data record associated with the transfer recipient.

The computing environment 100 includes at least one media source server 170. A media source server 170 may be associated with a third-party service that provides multimedia content to one or more computer systems. Specifically, a media source server 170 may transmit multimedia content items to computing devices that request the content. A media source server 170 may host content items locally. Additionally, or alternatively, a media source server 170 may obtain content data from remote sources and transmit the content data to requesting computing devices The computing environment 100 also includes a resource transfer processing system 180. The resource transfer processing system 180 may be implemented by a computing system. In particular, the resource transfer processing system 180 may comprise a platform, network, or other form of digital infrastructure that facilitates transfer of resources between sender and recipient entities. A resource transfer processing system 180 may include one or more transfer rail servers, such as electronic funds transfer (e.g., payment) rail servers. The transfer rail servers may comprise infrastructure used in the processing of resource transfer transactions and the communication of transaction messages and other similar data between the resource transfer processing system 180 and other interconnected entities (e.g., financial institutions, payment gateways, etc.). The resource transfer processing system 180 may use various protocols and procedures in processing resource transfer transactions. Examples of computing systems which may be configured for use as a resource transfer processing system 180 include those operated by VISA®, MasterCard®, American Express®, PayPal®, and the like. The resource transfer processing system 180 may include or interface with one or more systems implementing clearing and settlement solutions.

As described above, the client device 110, the resource server 160, the media source server 170, and the resource transfer processing system 180 may be computer systems. The client device 110, the resource server 160, the media source server 170, and the resource transfer service 180 may be in geographically disparate locations. Put differently, the client device 110 may be remote from at least one of the resource server 160, the media source server 170, and the resource transfer processing system 180.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource server 160 may provide both data transfer processing (e.g., bill payment) and data holding (e.g., banking) functions. That is, the resource server 160 may be both a financial institution server and also a bill payment processing server. The resource server 160 may, in some embodiments, be a proxy server, serving as an intermediary for requests for client devices 110 seeking resources from other servers. For example, the resource server 160 may be a proxy connecting client devices 110 to servers or data stores storing vehicle data (e.g., make, model, price, etc.) for a plurality of vehicles.

Figure 2A:
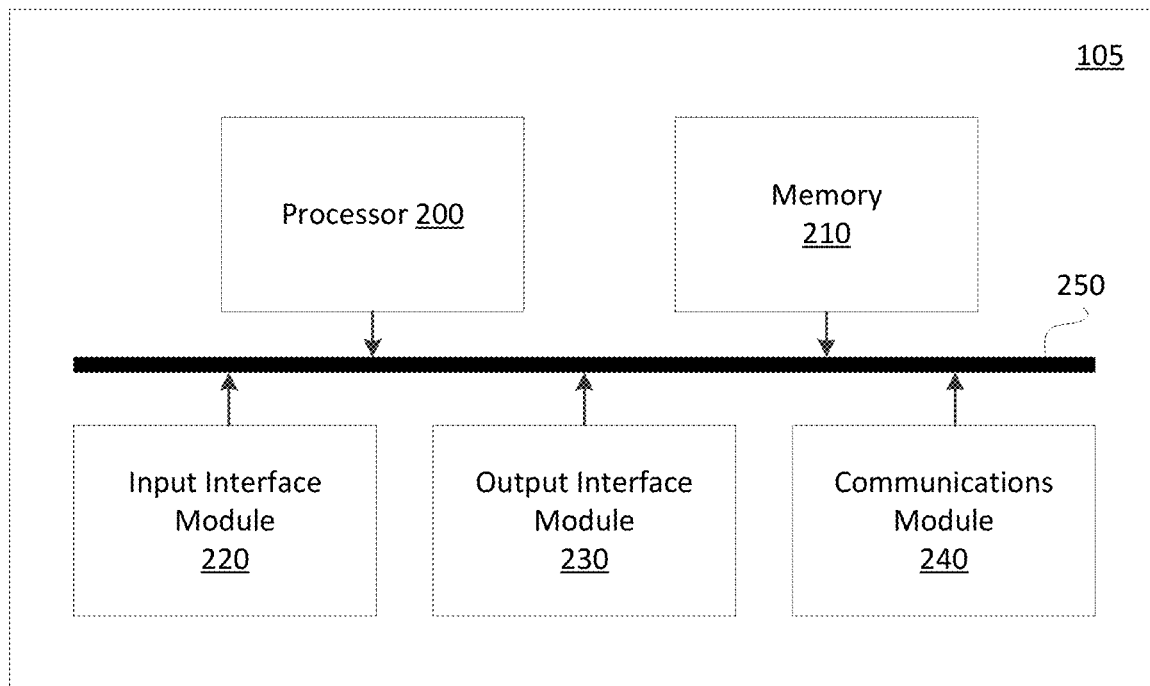
FIG. 2A is a high-level schematic diagram of an example computing device.

FIG. 2A is a high-level operation diagram of the example computing device 105. In at least some embodiments, the example computing device 105 may be exemplary of one or more of the client device 110, the resource server 160, the media source server 170, and the resource transfer processing system 180. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
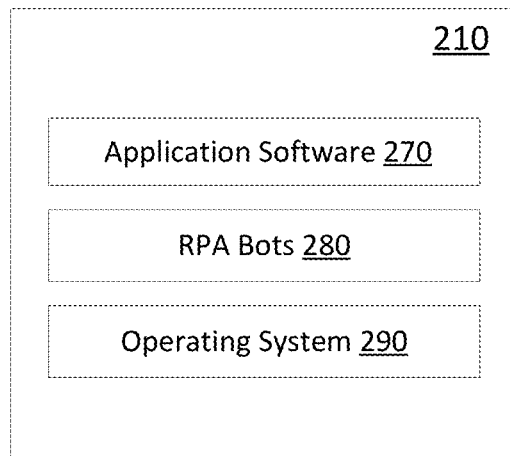
FIG. 2B shows a simplified organization of software components stored in memory of the example computing device of FIG. 2A.

FIG. 2B depicts a simplified organization of software components stored in memory 210 of the example computing device 105. As illustrated, these software components may include application software 270, robotic process automation (RPA) bot(s) 280, and an operating system 290.

The application software 270 adapts the example computing device 105, in combination with the operating system 290, to operate as a device performing particular functions. While a single application software 270 is illustrated in FIG. 2B, in operation, the memory 210 may include more than one application software 270 and different application software 270 may perform different operations.

In the example of FIG. 2B, the example computing device 105 includes one or more RPA bots 280, or software robots, that are executable by a processor (such as processor 200). The RPA bots 280 may be configured to perform various robotic tasks, based on instructions that are defined for the tasks and stored in the memory 210. An RPA bot 280 may be associated with one or more sub-bots or routines, which may also be stored in the memory 210. Upon completion of a robotic task, the RPA bots 280 may generate specific output(s) or otherwise notify a computing system that the task has been completed.

The operating system 290 is software. The operating system 290 allows the application software 270 and RPA bots 280 to access the processor 200, the memory 210, the input interface module 220, the output interface module 230 and the communications module 240. The operating system 290 may be, for example, Apple iOS™, Google™'s Android™, Linux™, Microsoft Windows™, or the like.

Figure 3:
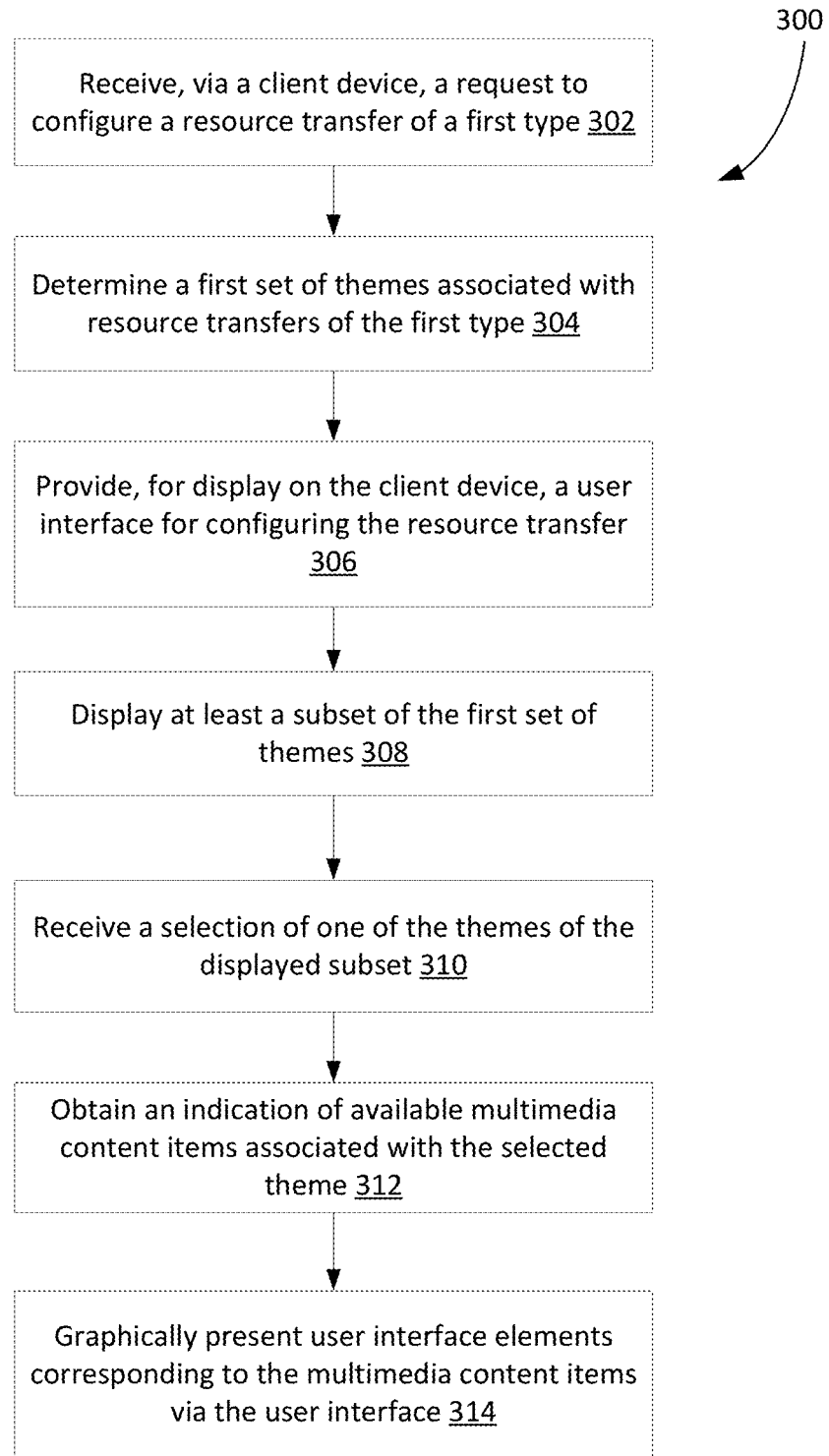
FIG. 3 shows, in flowchart form, an example method for configuring resource transfers between computing systems via a user interface on a client computing device.

Reference is made to FIG. 3, which shows, in flowchart form, an example method 300 for configuring resource transfers. More specifically, a computing system may enable a transferor entity to request a resource transfer and configure (e.g., add, edit, delete, etc.) transfer data associated with the resource transfer in accordance with the method 300. The requested resource transfer may then be processed by the computing system based on the configured transfer data for the resource transfer.

Operations 302 and onward are performed by one or more processors of a computing device such as, for example, the processor 200 (FIG. 2) of a suitably configured instance of the example computing device 105 (FIG. 2). The method 300 may be performed, for example, by a server that has access to and manages data records of a plurality of resource accounts. In particular, a server that is configured for managing resource accounts, such as the resource server 160, may implement the method 300. For example, a server may implement the method 300 as part of the processing of a requested transfer of resources in connection with a resource account.

In operation 302, the server receives, via a client device, a request to configure a resource transfer of a first type. The resource transfer may be a transfer that is requested by a transferor entity. The transferor entity may be associated with one or more sender resource accounts. A sender resource account may be a resource account belonging to (or owned, or otherwise associated with) the transferor and which is managed by the server. The requested resource transfer may be a transfer of resources that are associated with the sender resource account. In some embodiments, the resource transfer may be an electronic transfer for transferring funds, or stored value, associated with a banking account of a transferor entity. For example, the transferor entity may indicate a banking account and request that a certain amount of funds associated with the banking account be electronically transferred (e.g., via an electronic funds transfer (ETF), an email money transfer, and the like) to at least one recipient banking account.

In some embodiments, the server may directly execute a transfer operation for transferring resources associated with the transferor entity. That is, the server may itself perform operations for effecting the transfer of resources. Additionally, or alternatively, the server may convey instructions (or other messages) for retrieving the resources that are to be sent to a recipient entity. For example, the server may transmit, to a resource transfer processing system, instructions for causing movement of a requested quantum of resources to the recipient entity (or a resource account associated with the recipient entity). The instructions may be included, for example, in a message that is generated by the server based on transfer data associated with the requested resource transfer.

The request to configure the resource transfer may be received via a user interface on the client device. In particular, the request may be received (by the server) via a graphical user interface associated with an application, such as a mobile or web application, that is accessed on the client device. The application may, for example, be a resource account management application for managing resources associated with resource accounts. For example, the application may be a mobile banking application that allows users to access, modify, and otherwise manage their banking accounts. A transferor entity may use the application to request a transfer (e.g., an electronic funds transfer) and configure the settings of the requested transfer.

The transfer data for the requested resource transfer may include one or more transfer configuration settings. Examples of transfer configuration settings include, for example, quantum of resources for transfer, date/time of transfer (e.g., a schedule of delivery associated with a resource transfer), identity of transfer recipient(s), number and frequency of transfer operations, etc. The transfer configuration settings may be defined by the transferor entity. In particular, the transfer configuration settings may be inputted via the client device. In at least some embodiments, the same user interface that is used for requesting the resource transfer may be used to input one or more transfer configuration settings. For example, the transfer configuration settings may be inputted by the transferor entity as part of the steps of configuring the resource transfer prior to initiation of the transfer.

Figure 11:
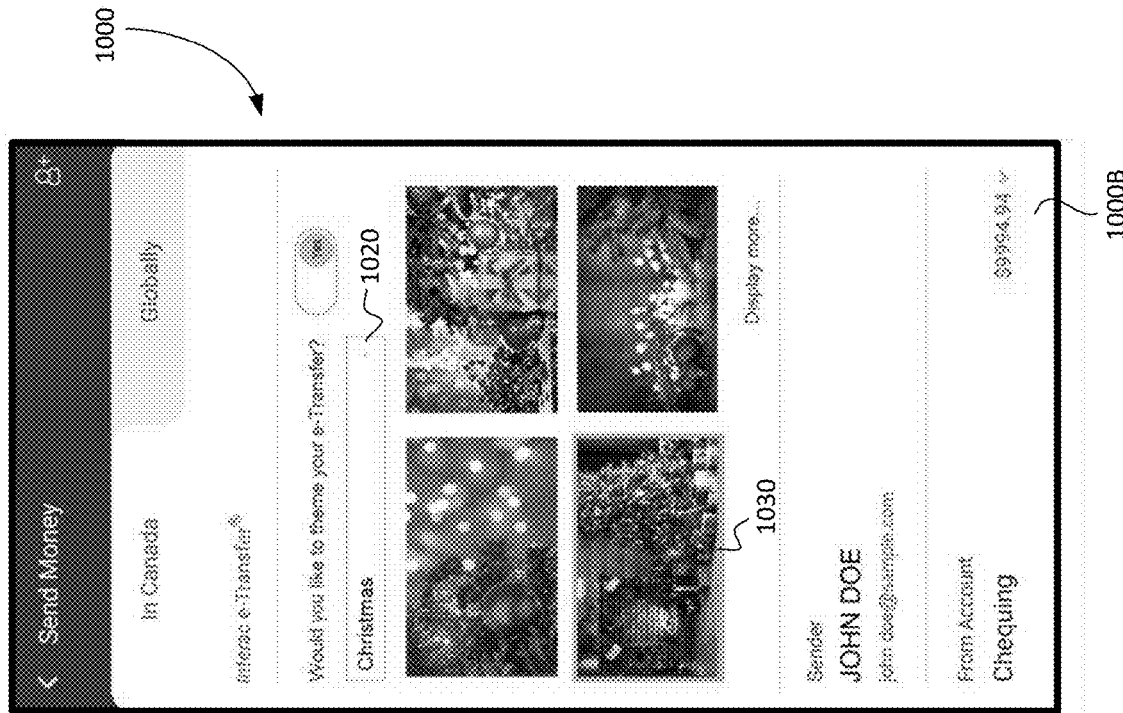
FIGS. 10 and 11 show pages of another example graphical user interface for configuring transfers of resources associated with a resource account.
Figure 10:
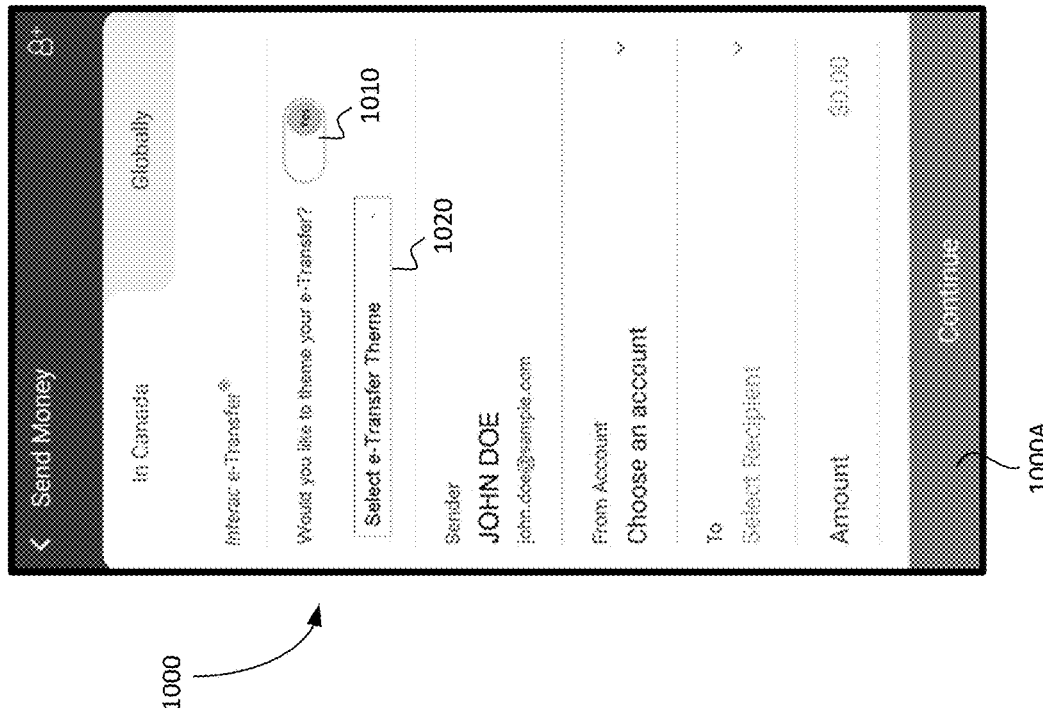

An example user interface 1000 for requesting a transfer of resources is illustrated in FIGS. 10 and 11. More specifically, FIGS. 10 and 11 show an example graphical user interface of an application (e.g., a mobile app) that can be used for requesting transfer of resources. The application may, for example, be a mobile banking application. A transferor entity can navigate to application page 1000A which presents various options for configuring a transfer (specifically, an email money transfer) to an intended recipient. In particular, the application page 1000A provides data fields that are customizable for a resource transfer. The data fields may relate to, and allow selection of, identifier and contact information of the transferor entity, a sender resource account, identifier of the recipient entity, and quantum of resources for transfer, among others.

The server determines a transfer type associated with the requested resource transfer. Examples of transfer types include: electronic funds transfer (e.g., ETF, email money transfers, etc.); transfer of computing resources (e.g., processing power, memory, etc.); digital asset transfer; and energy resource transfer.

In operation 304, the server determines a first set of themes associated with resource transfers of the first type. Upon determining a transfer type associated with the requested resource transfer, the server determines one or more themes associated with the transfer type. In at least some embodiments, the first set of themes may include message themes for messages that are generated in connection with the resource transfer. A message theme is a theme that can be applied to message content of a message. More specifically, a message theme may comprise message settings or properties that can be applied to content items of a message. Examples of message settings include: text font, size and/or color; image size and/or format; and background color and/or image.

As a requested resource transfer is processed, various messages associated with the resource transfer may be created. For example, a message containing instructions for effecting the resource transfer may be generated and sent to a resource transfer processing system. Such message may indicate, at least, transfer configuration settings associated with the requested resource transfer. As another example, notification messages may be sent to the sender and/or the recipient entities (e.g., as push notifications on devices) for relaying information about the resource transfer to said entities. A notification message may include, for example, content for notifying the recipient of the details of the resource transfer, such as the transferor/sender identity, quantum of resources for transfer, and related message content items (e.g., images, text, etc.). The first set of themes determined in operation 304 may include message themes that can be applied to such message(s) associated with the resource transfer.

In some embodiments, one or more themes of the first set may comprise transfer configuration settings that are associated with predefined events. More specifically, the theme data for at least one of the themes of the first set may include transfer configuration settings that are associated with a particular event. Examples of predefined events include holidays (e.g., Christmas, Thanksgiving, etc.) or other user-defined occasions (e.g., birthday, anniversary, etc.). The themes of the first set may be associated with at least one such predefined event. The theme data for a theme may include content items that are related to a respective event. For example, the theme data may include predetermined video data, image data, textual data, etc. that are associated with an event.

In operation 306, the server provides, for display on the client device, a user interface for configuring the resource transfer with theme data for a theme. The user interface may, for example, be the same interface that is used for requesting the resource transfer. As shown in the example of FIGS. 10 to 11, the server may provide, for display on the client device, a page of the application GUI that allows for customizing a message associated with the resource transfer. In particular, the application page may present features that enable customization of the message by applying theme data for a message theme to the message. The message customization page (e.g., application page 1000A) may be used to configure various aspects of a message associated with the resource transfer. For example, the message customization page may allow the transferor entity to add, modify, or delete one or more content items to a message associated with the resource transfer.

In the example of FIG. 10, the application page 1000A includes user interface elements that relate to selection of a theme to apply to a message for the intended recipient of a resource transfer. A toggle element 1010 may be used to enable or disable theme settings for the message. That is, the option to apply a theme to the message can be toggled on or off using the toggle element 1010. A dropdown menu 1020 may also be provided on the application page 1000A. The dropdown menu 1020 may allow selection of a particular theme for applying to the message. The list of themes that are provided via the dropdown menu 1020 may be determined in accordance with the techniques described herein for identifying themes that are associated with the resource transfer being requested.

In some embodiments, the server may display a message composition view via the user interface. For example, the message customization page of the application GUI may provide a message composition view that facilitates composing a message associated with the resource transfer. The message composition view may allow the transferor entity to populate various data fields of a message that can be sent in connection with the transfer of resources. In particular, the message composition view may include forms, text or list boxes, dropdown menus, and the like, for inputting message data. A composed message may be sent prior to, concurrently, or substantially concurrently with initiation of the transfer of resources to the recipient entity.

In providing the user interface, the server displays at least a subset of the first set of themes, in operation 308. The subset of themes may be displayed, for example, in a page of the application GUI. In particular, a graphical representation of the subset of themes may be provided as part of the application page. In some embodiments, the graphical representation of the themes may include image data (or other message content data) that is representative of the themes. For example, one or more selectable icons that include image data representative of the themes of the subset may be provided on the application page. More generally, the server may provide, via the user interface on the client device, selectable user interface elements corresponding to one or more options of themes for a message associated with the requested resource transfer. The selectable options of themes may be only those themes that are included in the first set.

In FIG. 11, the application page 1000B includes a display of a subset of themes that are associated with a specific event (i.e., Christmas). The themes are represented graphically as icons 1030 that are selectable on the application page 1000B. In particular, the selectable icons corresponding to the themes may be displayed responsive to (i.e., subsequent to) selection of one of the events included in a list provided in the dropdown menu 1020.

The server receives, via the client device, a selection of one of the themes of the displayed subset, in operation 310. For example, an input of a selection may be received via a graphical user interface, such as application page 1000B, of the application for configuring resource transfers. The input may, for example, be a selection of a user interface element (e.g., an icon) corresponding to one of the displayed themes of the first set.

In operation 312, the server obtains an indication of available multimedia content items associated with the selected theme. The multimedia content items may include, for example, at least one of image or audio data (e.g., animations, videos, photos, etc.). That is, the server may determine image and/or audio data that are associated with the selected theme. The multimedia content items may be included in a message associated with the requested resource transfer. In particular, the server obtains information about the multimedia content items that can be inserted into a message, such as a notification message, in connection with the requested resource transfer. The multimedia content items may be appended to other message data (e.g., message text) inputted by the transferor, for example, via a message composition view as described above.

In at least some embodiments, the server may obtain information about the available multimedia content items from a remote server. For example, the server may send, to a third-party server (such as the media source server 170 of FIG. 1), a query to obtain a list of multimedia content items that are associated with the selected theme. The content items may, for example, be items that are related to an event corresponding to the selected theme. Additionally, or alternatively, the server may itself store information multimedia content items information in connection with messages themes of the first set. For example, the server may maintain the information in a local database and retrieve the information upon receiving selection of a message theme.

The server may generate a mapping of message themes to available multimedia content items. In particular, a mapping of sets of multimedia content items to message themes may be defined. The selection of multimedia content items to present via the user interface may then be determined based on the mapping and the selected theme from the first set.

In operation 314, the server graphically presents user interface elements corresponding to the multimedia content items via the user interface. The user interface elements may be displayed, for example, in a message composition view for a message associated with the resource transfer. In some embodiments, the user interface elements may include selectable icons (or similar elements) representing image backgrounds for a message (e.g., an electronic card) that is associated with the resource transfer. The image background corresponding to a selected icon can be applied to the message. That is, a graphical representation of a message, such as an electronic card, that is to be sent to the recipient entity may be modified so as to include an image background corresponding to the sender-selected user interface element.

In a similar manner, multimedia content items that are selected by the transferor entity, via the user interface, may be incorporated into a message directed to the recipient entity for the resource transfer. For example, multimedia files such as videos, photos, audio recordings, etc. may be included as attachments to the message associated with the resource transfer, or embedded in the message body of the message.

The user interface elements may be displayed only upon selection of a particular theme. In particular, information about the available multimedia content items for the message may not be displayed at least until a selection of a theme is received by the server. In the example user interface shown in FIGS. 10 and 11, a theme may be selected using the dropdown menu 1020. The available multimedia content items for the message may be displayed responsive to selection from the dropdown menu 1020, and updated as different one of the themes in the dropdown menu 1020 are selected.

Figure 4:
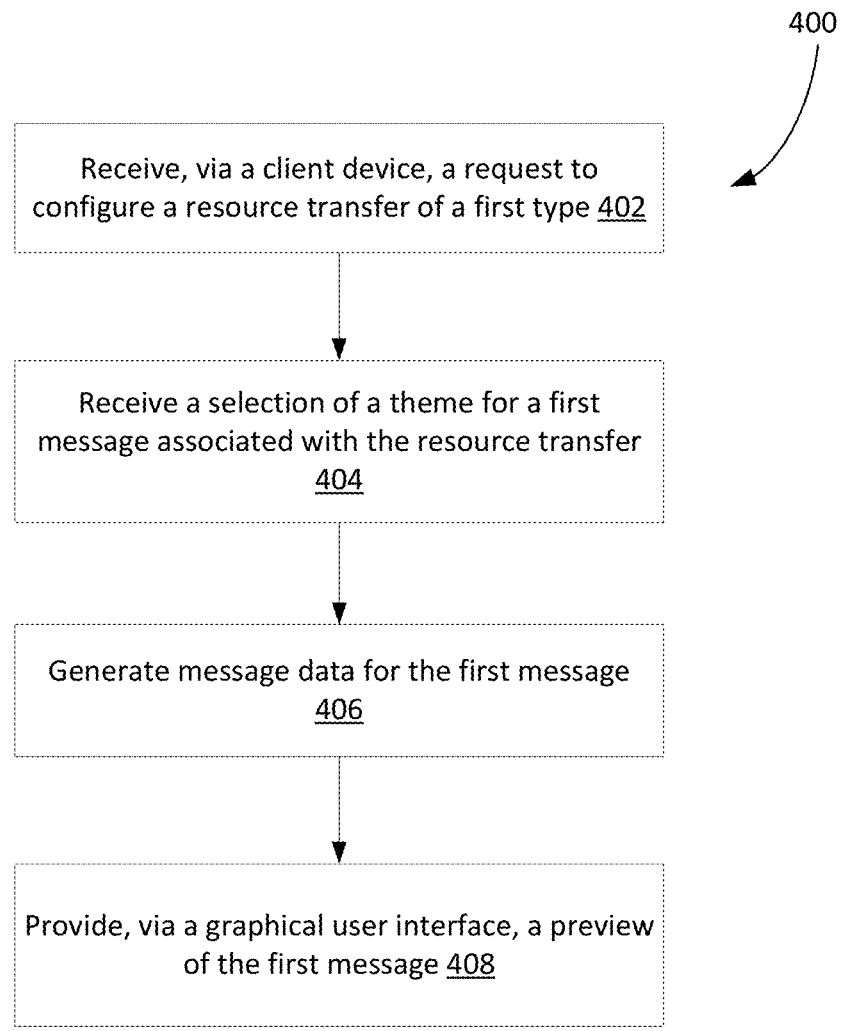
FIG. 4 shows, in flowchart form, another example method for configuring resource transfers between computing systems via a user interface on a client computing device.

Reference is made to FIG. 4, which shows, in flowchart form, another example method 400 for configuring resource transfers. More particularly, a computing system may enable a transferor entity to request a resource transfer and configure transfer data associated with the resource transfer in accordance with the method 400. The requested resource transfer may then be processed by the computing system based on the configured transfer data for the resource transfer.

Operations 402 and onward are performed by one or more processors of a computing device such as, for example, the processor 200 (FIG. 2) of a suitably configured instance of the example computing device 105 (FIG. 2). The method 400 may be performed, for example, by a server that has access to and manages data records of a plurality of resource accounts. In particular, a server that is configured for managing resource accounts, such as the resource server 160, may implement the method 400. For example, a server may implement the method 400 as part of the processing of a requested transfer of resources in connection with a resource account. The operations of method 400 may be performed in addition to, or as alternatives of, one or more operations of method 300.

In operation 402, the server receives, via a client device, a request to configure a resource transfer of a first type. A transferor entity may request a resource transfer and define one or more transfer configuration settings for the resource transfer. For example, the request may be made using a graphical user interface associated with an application, such as a resource account management application, that is accessed on the client device. The resource transfer may, for example, be an electronic transfer of funds associated with a banking account of the transferor entity.

In operation 404, the server receives a selection of a theme for a first message associated with the requested resource transfer. The first message may, for example, be a message that is intended to accompany the resource transfer. That is, the first message may be sent to the intended recipient entity in connection with the resource transfer. The first message may be sent concurrently or substantially concurrently with the transfer of resources. In at least some embodiments, the contents of the first message may be provided by the transferor entity. For example, the message may be a notification message about the resource transfer that is customized by the transferor entity prior to the transfer.

The selected theme may be a message theme for applying to the first message. In particular, the theme data for the selected theme may include message settings to apply to the content of the first message. Examples of message settings include: text font, size and/or color; image size and/or format; and background color and/or image.

In operation 406, the server generates message data for the first message. In some embodiments, the first message may be formatted as a digital message object, such as an electronic card. The first message may be formatted using the selected theme and user-inputted transfer configuration settings. The message data for the first message may comprise user-defined message content (e.g., message text) as well as predetermined content items associated with the selected theme for the first message. The user-defined message content may be obtained via a user interface accessed on the sender's device. For example, the message data may include content that is inputted by the sender using a message composition interface. The message composition interface may be, for example, integrated into an application for managing resource transfers (e.g., a mobile banking application).

In operation 408, the server provides, via a graphical user interface, a preview of the first message. The preview may be a graphical representation of how the first message and its contents will be displayed when the first message is received by the recipient entity. In at least some embodiments, the server may display a user interface element on the graphical user interface that launches the preview of the first message. The preview of the first message may be displayed only upon actuation of the associated user interface element. For example, a user interface element may be provided in a message composition interface for composing a message associated with the resource transfer. Upon selection of the user interface element, a preview interface (e.g., a pop-up window) presenting a preview of the first message may be displayed independently of the message composition interface. For example, a preview window showing a preview of the first message may be overlaid on top of the message composition window.

Another example user interface 600 for requesting and configuring resource transfers is shown in FIGS. 6 to 9. The user interface 600 may provided via a web browser or application. In particular, the user interface 600 may be an interface for a web service (e.g., website) for accessing and managing resource accounts. A resource account owner can use the user interface 600 for requesting and configuring transfers of resources associated with their resource accounts. For example, the user interface 600 may comprise a web front-end for configuring an electronic funds transfer (e.g., email money transfer) associated with a banking account and for generating a message, such as a notification message, associated with the transfer.

The application page 600A includes user interface elements (buttons 610) corresponding to a plurality of predefined events (e.g., birthday, Christmas, etc.). Selection of one of the buttons 610 causes a set of themes and/or multimedia content items associated with the corresponding event to be displayed. For example, selectable icons 620 that graphically represent background images for a message associated with the resource transfer may be displayed on page 600A, responsive to selection of one of the events. The icons 620 are selectable to indicate a selection of a theme or multimedia content item to include in the message.

The transferor can proceed to a subsequent application page 600B for configuring the resource transfer (for example, using the user interface element 630). The application page 600B includes a graphical representation 710 of a selected theme (and/or associated multimedia content items) for the message and data fields 720 that can be populated manually. One or more of the data fields 720 may include predefined default values which may be changed by the transferor during configuration. The data fields 720 may relate to, and allow selection of, identifier of the transferor entity, a sender resource account, identifier and contact information of the recipient entity, quantum of resources for transfer, and date/time of scheduled transfer, among others.

The application page 600C allows the transferor to review details of the requested resource transfer, including inputted information and transfer configuration settings. The transferor may also view a preview of the message that will be generated and sent in connection with the resource transfer. In particular, the application page 600C includes at least one user interface element 810 for launching a preview of the message associated with the resource transfer. The preview, such as preview 910 of FIG. 9, may be displayed in the user interface 600. For example, the preview 910 may be overlaid on top of an application page 600C for reviewing details of the requested resource transfer. The preview 910 comprises a graphical representation of the message as it will be viewed by the intended recipient. For example, the preview 910 may include message content selected and/or inputted by the transferor and be formatted in a message form that will be accessible by the recipient. The resource transfer can be initiated by selection of a user interface element 820. In particular, the user interface element 820 can be selected to initiate the operations for transferring resource to the recipient.

Additionally, or alternatively, the user interface element 820 may initiate sending of the generated message to the recipient. In some embodiments, selecting the user interface element 820 may only send the message to the recipient, without transferring any resources to the recipient. The actual transfer of resources may only be initiated upon express request by the recipient. For example, the message body of the message that is sent to the recipient may include a link (or other user interface element) for expressly confirming and requesting the transfer of resources. The recipient may, for example, be enabled to accept or reject the resource transfer from the transferor, input security information (e.g., password, answers to security questions, etc.) that is necessary for accessing, or releasing, the resources for transfer to the recipient, and identify an account of the recipient for receiving the resources.

Figure 5:
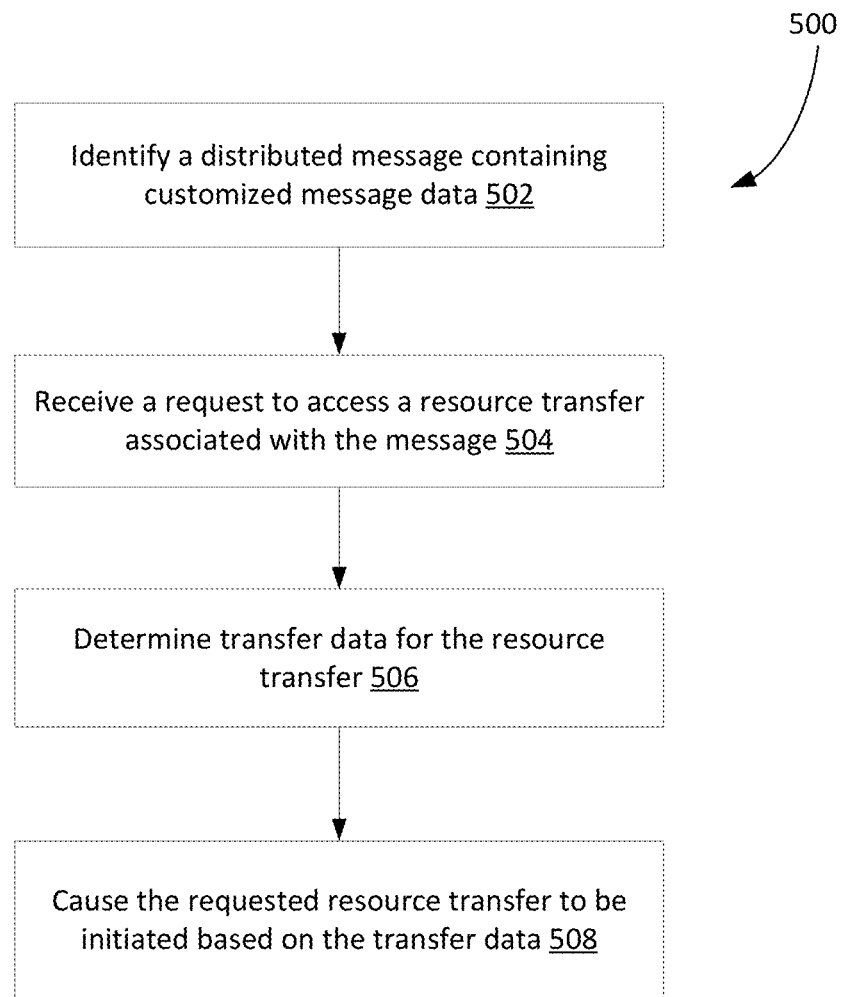
FIG. 5 shows, in flowchart form, an example method for processing push-based transfer of resources between computing systems.
Figure 6:
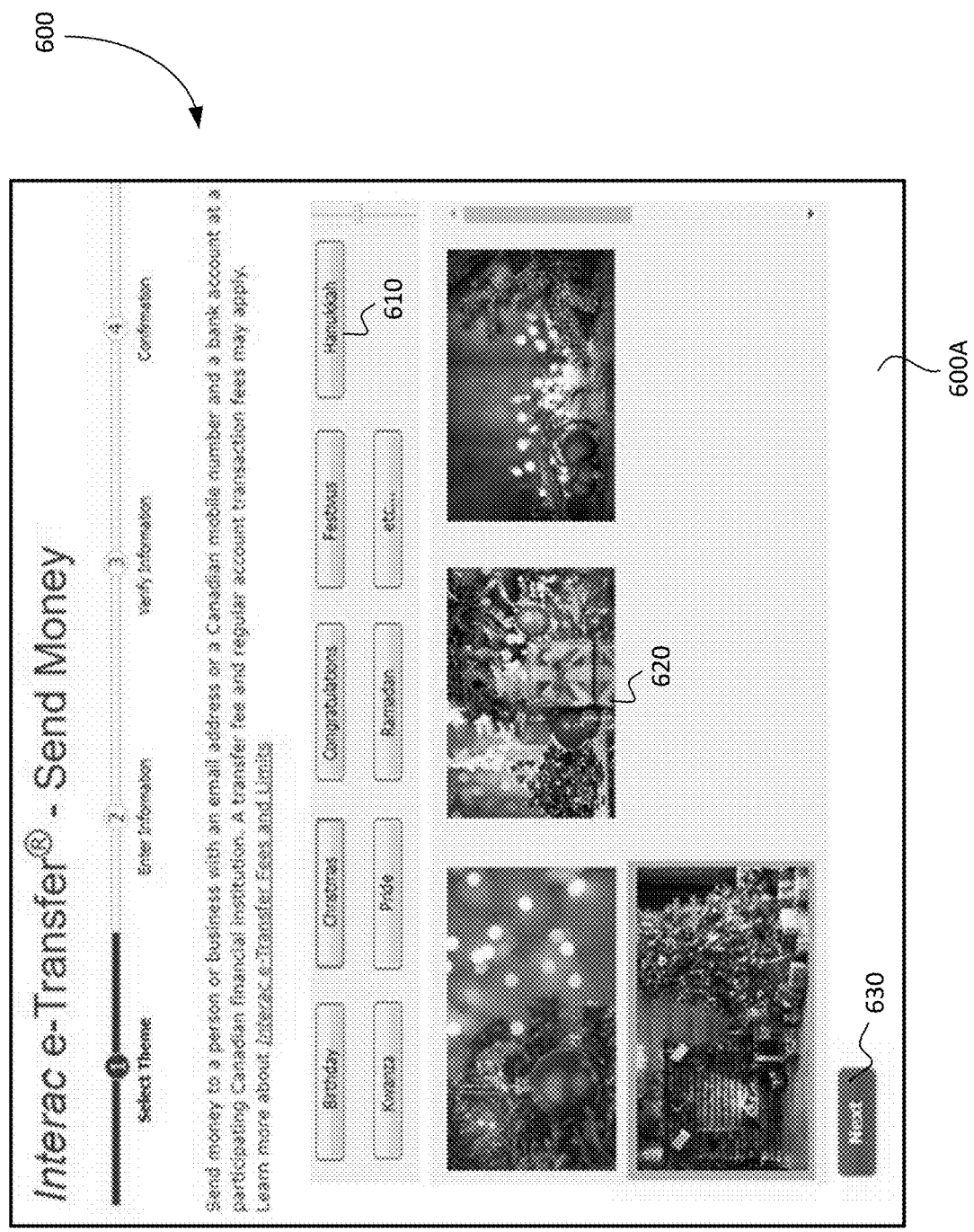
FIG. 6 shows a page of an example graphical user interface for configuring transfers of resources associated with a resource account.
Figure 7:
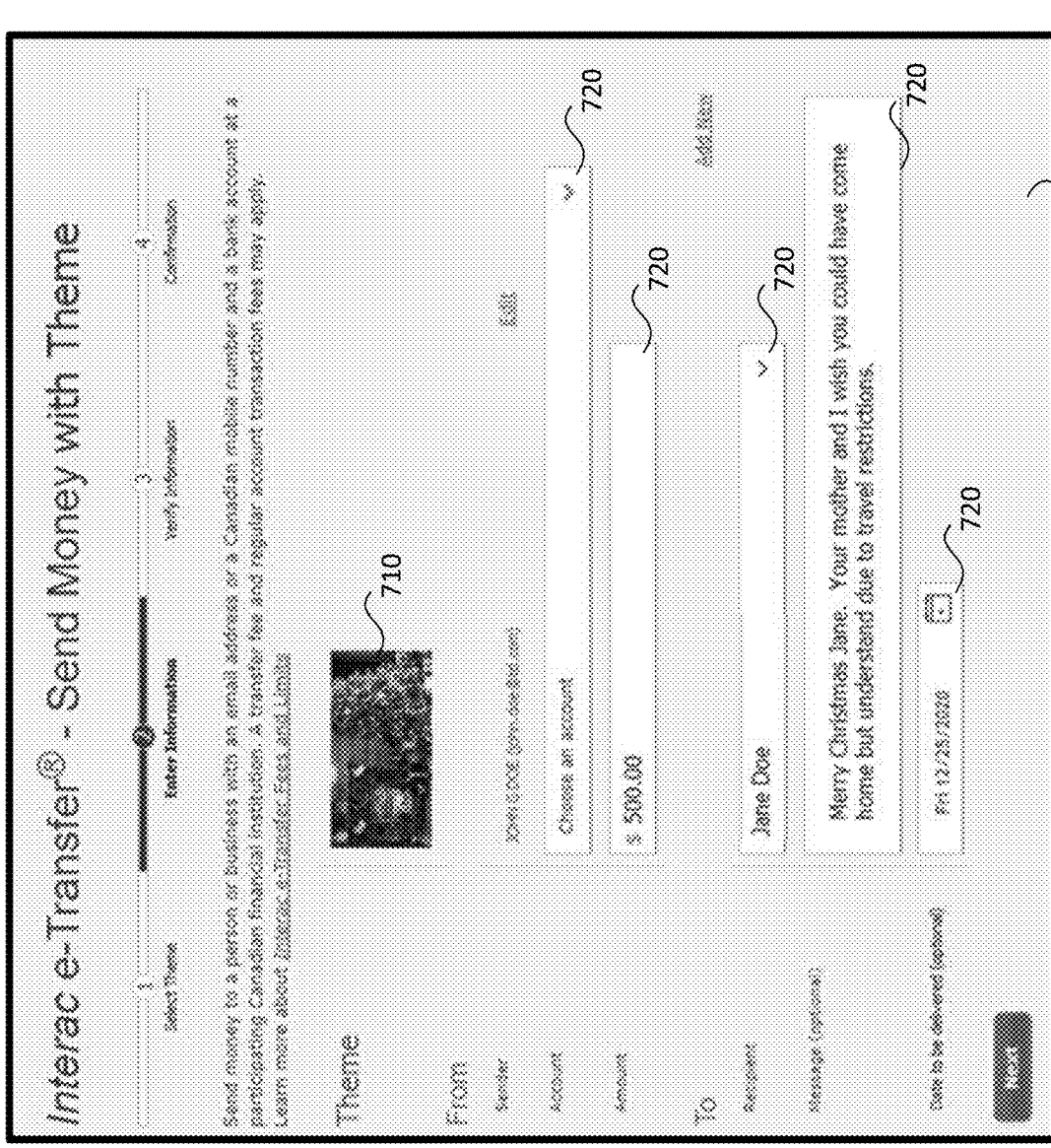
FIG. 7 shows another page of the example graphical user interface of FIG. 6.
Figure 8:
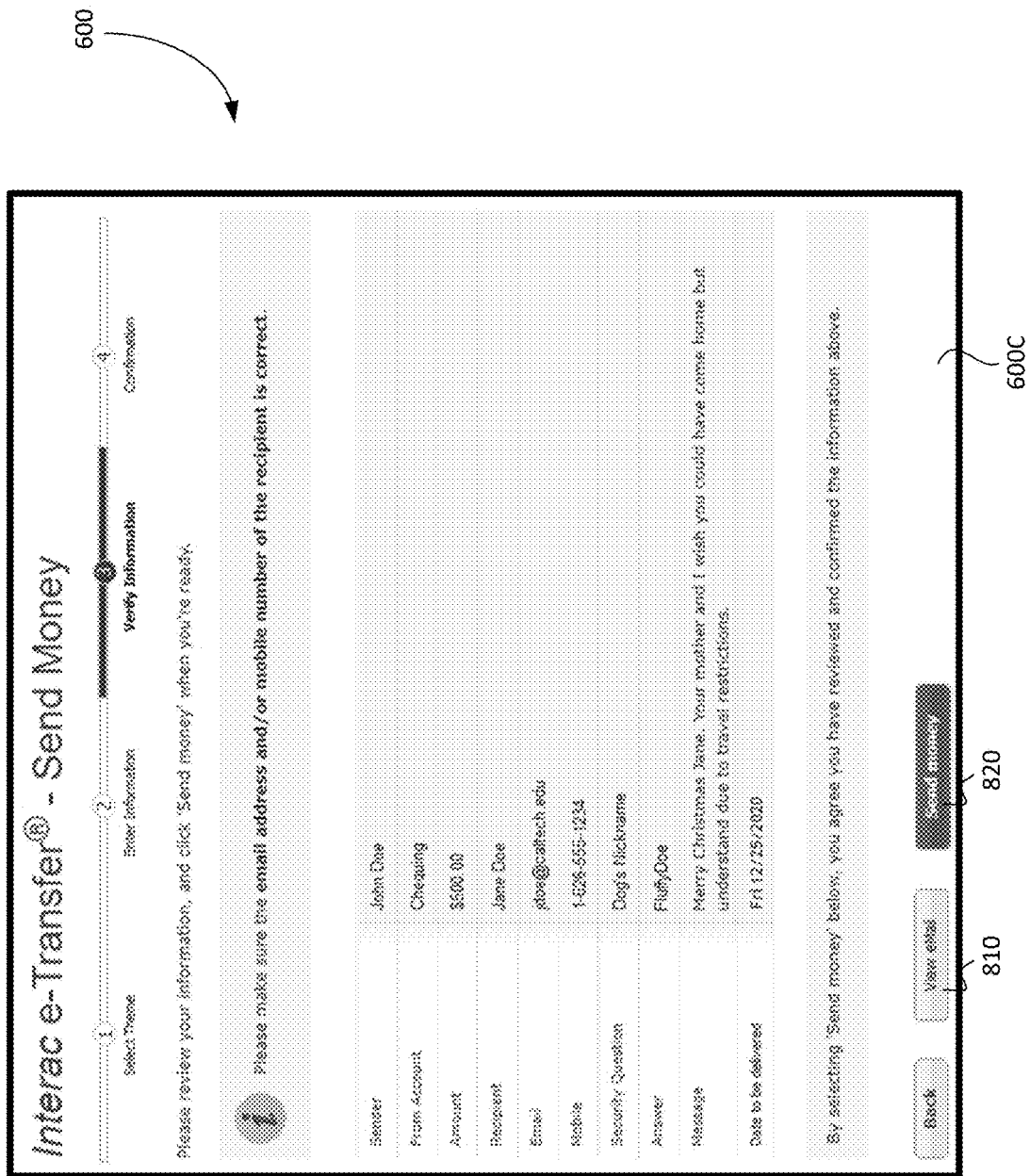
FIG. 8 shows another page of the example graphical user interface of FIG. 6.
Figure 9:
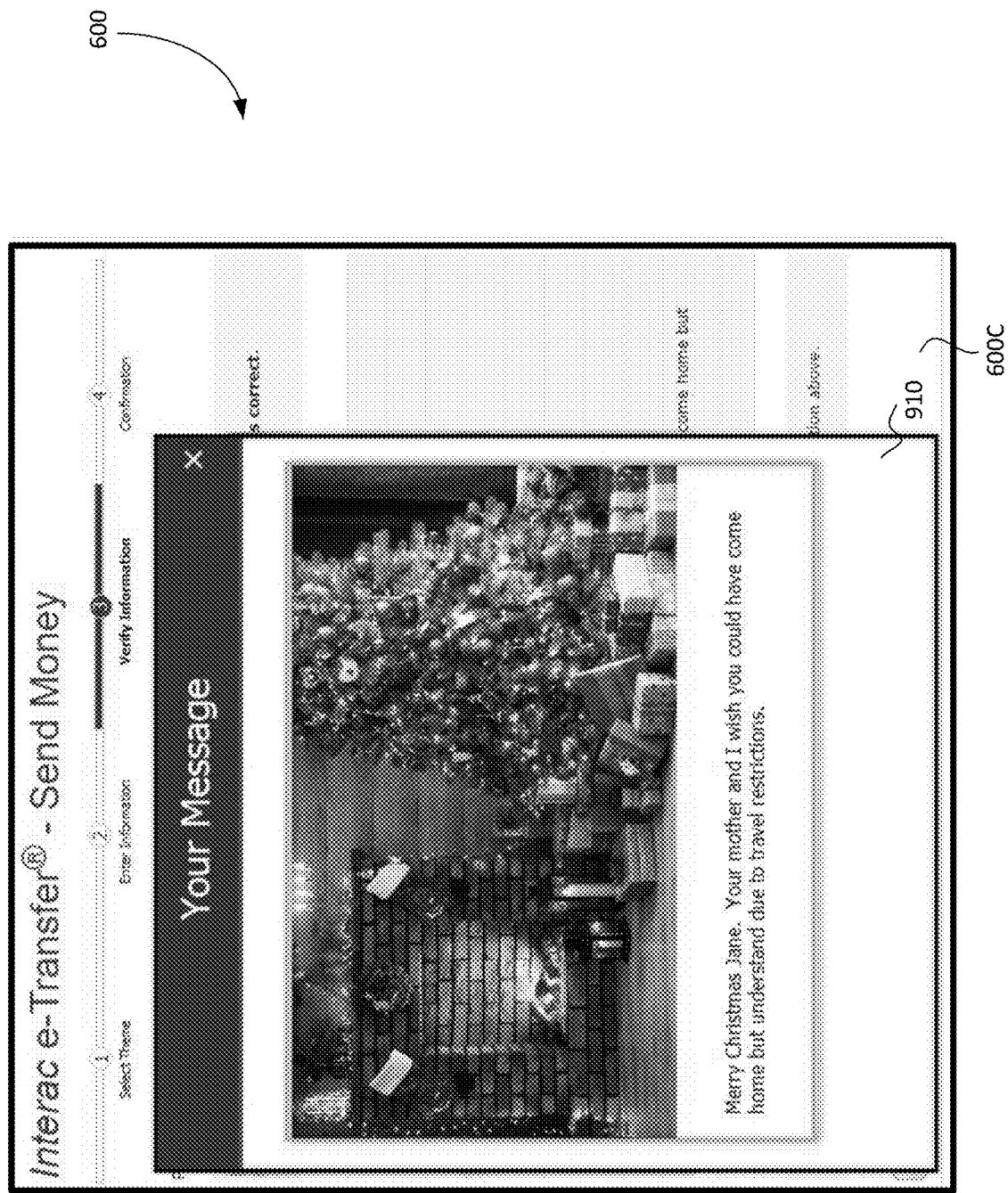
FIG. 9 shows another page of the example graphical user interface of FIG. 6.

Reference is made to FIG. 5, which shows, in flowchart form, another example method 500 for processing push-based transfer of resources between computing systems. More specifically, a computing system may enable a transferor entity to request a resource transfer and configure transfer data associated with the resource transfer in accordance with the method 500. The requested resource transfer may then be processed by the computing system using the configured transfer data for the resource transfer.

Operations 502 and onward are performed by one or more processors of a computing device such as, for example, the processor 200 (FIG. 2) of a suitably configured instance of the example computing device 105 (FIG. 2). The method 500 may be performed, for example, by a server that has access to and manages data records of a plurality of resource accounts. In particular, a server that is configured for managing resource accounts, such as the resource server 160, may implement the method 500. For example, a server may implement the method 500 as part of the processing of a requested transfer of resources in connection with a resource account. The operations of method 500 may be performed in addition to, or as alternatives of, one or more operations of methods 300 and 400.

As described above, a resource transfer between computing systems may be accompanied by message data for one or more messages. For example, messages that are composed by the transferor entity may be sent concurrently or substantially concurrently with the intended transfer of resources to a recipient. In at least some embodiments, the communication of the message to the recipient is processed independently of the resource transfer. That is, the message data for the message may be conveyed separately from the transfer of resources. By way of illustration, the message sent by the transferor entity via a first communication channel (e.g., email, app notification, etc.) and the resource transfer may be processed via a second communication channel (e.g., a resource transfer processing system, such as a payment rail). In some embodiments, the transfer of resources may be conditional on receipt of the message and one or more designated actions by the intended recipient entity. For example, the recipient may be required to provide a password or an answer to a particular question in order for the resource transfer to be initiated and processed. The input of the required password (or answer, and the like) may thus be a precondition to the requested transfer of resources to the recipient entity.

An example method for processing message transmission and resource transfer is now described. In operation 502, the server identifies a distributed message containing customized message data. The distributed message may, for example, be a message that has been or is scheduled to be delivered to the recipient entity. The message may thus comprise published message content that is accessible by the recipient. In some embodiments, the message may be distributed as a notification provided via an application. For example, the message data for the message may be included in a push notification of an application that is resident on a client device of the recipient entity. The message data may be obtained upon selecting the notification, for example, by launching the application and accessing the notification data associated with the notification.

The message data for the customized message may be retrieved by the application. In some embodiments, the application may be provided with a push reference to content items associated with the message and the application may access the message data using the push reference. The application can then pull the message data for presenting on the client device. That is, the push reference serves as meta content that is used by the application to pull the message data for the message.

In operation 504, the server receives a request to access a resource transfer associated with the message. The message data for the message may include an indication of a resource transfer that is intended for a recipient entity. Upon accessing the message data, the recipient may request the resource transfer to be processed. For example, the message may include a selectable link associated with a resource transfer, and the recipient may input selection of the link to request access to the resource transfer. In this way, a resource transfer that is intended for a particular recipient can be linked out to published content, such as the message data of a distributed or published message.

In operation 506, the server determines transfer data for the resource transfer. In particular, the server may obtain transfer configuration settings associated with the resource transfer. The transfer configuration settings may, in some embodiments, be included as metadata of the message that is presented to the recipient.

In operation 508, the server causes the requested resource transfer to be initiated based on the transfer data. For example, the server may transmit transfer data associated with the resource transfer to a third-party system, such as a resource transfer processing system, with instructions to initiate the transfer associated with the resource transfer intended for the recipient.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A computing system, comprising:
a processor;
a communications module coupled to the processor; and
a memory coupled to the processor, the memory storing instructions that, when executed, configure the processor to:
receive, via a client device, a request to configure a resource transfer of a first type;
determine a first set of themes associated with resource transfers of the first type;
provide, for display on the client device, a graphical user interface for configuring the resource transfer with theme data for a theme, wherein providing the user interface includes:
displaying a graphical representation of at least a subset of the first set of themes in a page of the graphical user interface;
receiving, via the graphical user interface, a selection of one of the themes of the displayed subset;
obtaining an indication of available multimedia content items associated with the selected theme based on
transmitting, to a remote media source server, a query for obtaining a list of the multimedia content items associated with the theme to present;
generating a mapping of message themes to available multimedia content items;
selecting multimedia content items to present via the graphical user interface based on the mapping and the selected theme;
graphically presenting user interface elements corresponding to the multimedia content items including selectable icons representing image backgrounds in a message composition view for a message via the graphical user interface;
modifying a graphical representation of the message composition view for including user-selected multimedia content data and applying a selected one of the image backgrounds to the graphical representation, and
cause a message composed via the message composition view and a concurrent transfer of resources comprising stored value associated with the message to be sent.
2. The computing system of claim 1, wherein the user interface elements corresponding to the multimedia content items comprise selectable icons representing image backgrounds for an electronic card associated with the resource transfer.

3. The computing system of claim 1, wherein each theme of the first set comprises transfer configuration settings associated with at least one predefined event.

4. The computing system of claim 1, wherein providing the user interface for configuring the resource transfer further includes displaying a preview of an electronic card associated with the resource transfer, the electronic card being formatted in accordance with the selected theme and user-inputted transfer configuration settings.

5. The computing system of claim 1, wherein the multimedia content items comprise at least one of image or audio data.

6. The computing system of claim 1, wherein providing the user interface further includes:
 determining one or more transfer configuration settings associated with the resource transfer; and
 graphically presenting user interface elements corresponding to the one or more transfer configuration settings via the user interface.

7. The computing system of claim 6, wherein the one or more transfer configuration settings includes a schedule of delivery associated with the resource transfer.

8. The computing system of claim 6, wherein the resource transfer comprises an email money transfer.

9. A computer-implemented method, comprising:
 receiving, via a client device, a request to configure a resource transfer of a first type;
 determining a first set of themes associated with resource transfers of the first type;
 providing, for display on the client device, a graphical user interface for configuring the resource transfer with theme data for a theme, wherein providing the user interface includes:
  displaying a graphical representation of at least a subset of the first set of themes in a page of the graphical user interface;
  receiving, via the graphical user interface, a selection of one of the themes of the displayed subset;
  obtaining an indication of available multimedia content items associated with the selected theme based on transmitting, to a remote media source server, a query for obtaining a list of the multimedia content items associated with the theme to present;
  generating a mapping of message themes to available multimedia content items;
  selecting multimedia content items to present via the graphical user interface based on the mapping and the selected theme;
  graphically presenting user interface elements corresponding to the multimedia content items including selectable icons representing image backgrounds in a message composition view for a message via the graphical user interface; and
  modifying a graphical representation of the message composition view for including user-selected multimedia content data and applying a selected one of the image backgrounds to the graphical representation, and
 causing a message composed via the message composition view and a concurrent transfer of resources comprising stored value associated with the message to be sent.

10. The method of claim 9, wherein the user interface elements corresponding to the multimedia content items comprise selectable icons representing image backgrounds for an electronic card associated with the resource transfer.

11. The method of claim 9, wherein each theme of the first set comprises transfer configuration settings associated with at least one predefined event.

12. The method of claim 9, wherein providing the user interface for configuring the resource transfer further includes displaying a preview of an electronic card associated with the resource transfer, the electronic card being formatted in accordance with the selected theme and user-inputted transfer configuration settings.

13. The method of claim 9, wherein the multimedia content items comprise at least one of image or audio data.

14. The method of claim 9, wherein providing the user interface further includes:
 determining one or more transfer configuration settings associated with the resource transfer; and
 graphically presenting user interface elements corresponding to the one or more transfer configuration settings via the user interface.

15. The method of claim 14, wherein the one or more transfer configuration settings includes a schedule of delivery associated with the resource transfer.

16. The method of claim 14, wherein the resource transfer comprises an email money transfer.

* * * * *